UNITED STATES PATENT OFFICE.

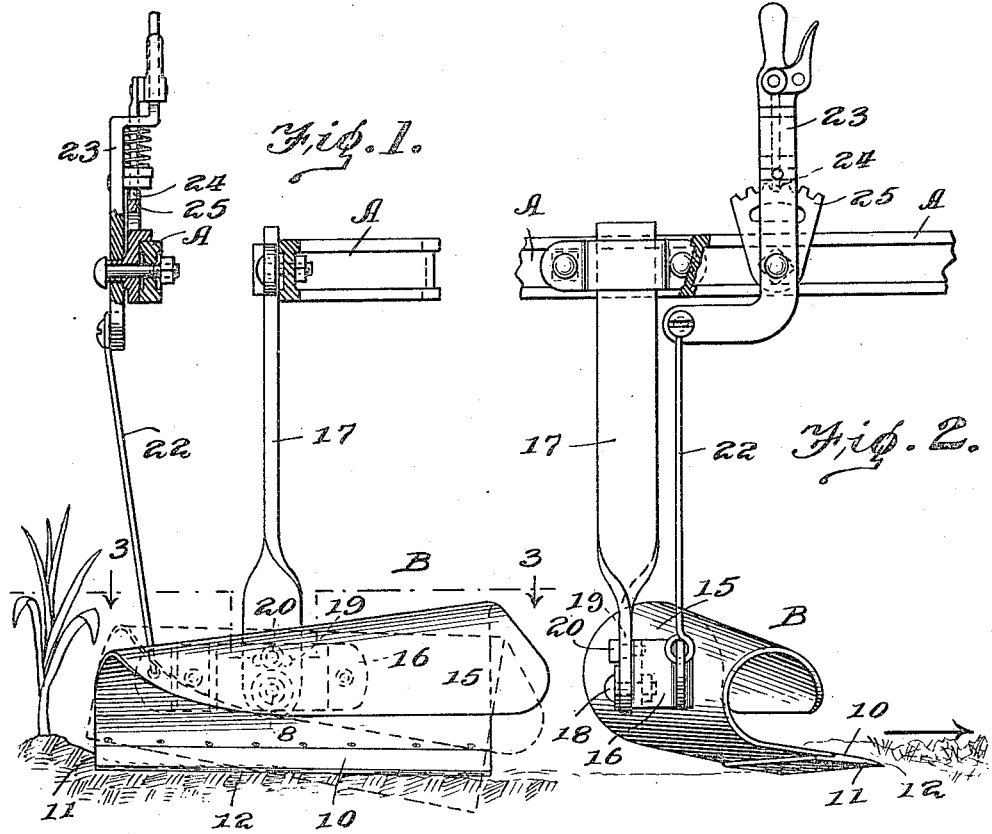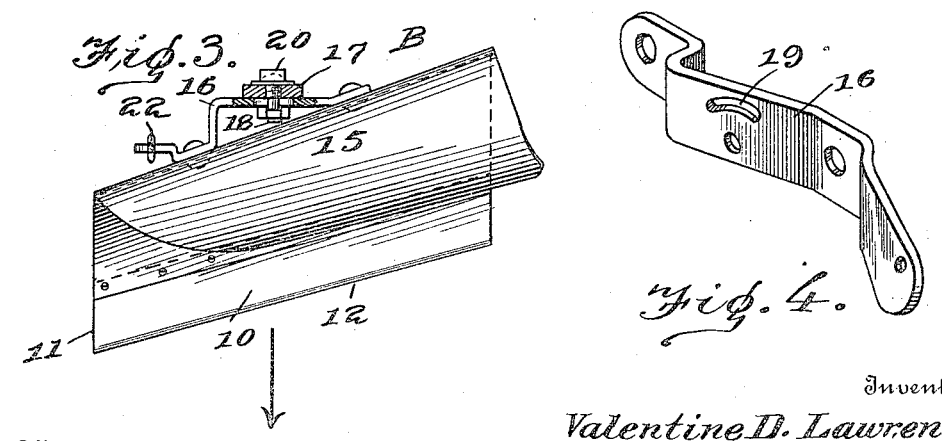

VALENTINE D. LAWRENCE, OF NEMAHA, NEBRASKA.

CULTIVATOR-SHOVEL.

1,225,659.  Specification of Letters Patent.  Patented May 8, 1917.

Application filed May 3, 1916. Serial No. 95,172.

*To all whom it may concern:*

Be it known that I, VALENTINE D. LAWRENCE, a citizen of the United States, residing at Nemaha, in the county of Nemaha and State of Nebraska, have invented new and useful Improvements in Cultivator-Shovels, of which the following is a specification.

This invention relates to cultivators and has particular reference to a shovel therefor. In cultivating crops such as corn or the like, it has been found necessary to employ a fender to prevent the surplus quantity of dirt, weeds, grass, etc., from being thrown over upon the crops, which is very injurious to young crops, oftentimes ruining the latter.

Therefore the chief characteristic of my invention resides in the provision of a shovel of the above mentioned character, which serves to carry the weeds, grass and surplus dirt away from the crops, thereby functionating in the dual capacity of a shovel and fender.

The invention provides a shovel having a substantially cone-shaped receiving portion causing the material to pass therethrough with a circuitous motion, so that the material is discharged from one end of the receiving portion in a reverse position, that is to say the grass and weeds will be covered by the dirt with a view of preventing growth, the shovel being constructed to permit of the discharge of richer and finer dirt about the crop.

In carrying out my invention I provide means whereby the shovel can be easily and quickly adjusted to regulate the depth of the cut, the invention being susceptible for use in conjunction with any kind of cultivator.

The nature and advantages of the invention will be better understood from the following description when taken in connection with the accompanying drawing, and wherein:

Figure 1 is a view showing the manner of supporting the shovel from a cultivator beam, the dotted lines showing one of the adjusted positions of the shovel.

Fig. 2 is a view showing the shovel in end elevation.

Fig. 3 is a sectional view taken on line 3—3 of Fig. 1 looking in the direction of the arrow.

Fig. 4 is a detail view of the angle iron.

Referring more particularly to the drawing in detail A indicates cultivator beams and B generally the shovel constructed in accordance with my invention. As shown the shovel comprises a substantially flat blade 10 preferably constructed from steel, and having the adjacent sides 11 and 12 respectively defining cutting edges. The blade along one edge is connected thereto in any suitable manner to the receiving portion 15 which is preferably constructed from some lighter and less expensive material than the blade 10.

Depending from the beam A and secured thereto in any suitable manner is a supporting standard 17, upon the lower end of which the shovel is pivotally mounted on the pivot bolt 18. The strap 16 is provided with an arcuate shaped slot 19 which receives a bolt 20 carried by the standard 17. The lower end of a rod 22 is connected with the strap 16 adjacent its forward extremity, while the opposite end of the rod is connected to the adjacent end of an operating lever 23 pivoted upon one of the beams A, and having associated therewith a spring pressed pawl 24 coöperating with a rack bar 25 to hold the lever in different adjusted positions. Manifestly by reason of the connection between the standard 17 and the strap 16, the shovel is capable of being tilted through the instrumentality of the lever 23 and the connecting bar 22, so that the depth of the cut can be easily regulated by changing the position of the shovel, the slot and pin connection limiting the movements of the shovel, while the pawl 24 coöperates with the rack bar 25 to hold the shovel in its different adjusted positions. It is of course to be understood that the shovel is susceptible for use in connection with all types of cultivators, and that the standard 17 is carried by the shovel for adjustment with a suitable support. In consideration of this fact the operating means for the shovel including the rod 22, lever 23 and the pawl and ratchet mechanism may be eliminated, and the bolt 17 provided with a nut which when tightened will hold the shovel in adjusted position.

It will now be noted that as the shovel plows through the ground, the dirt, including the weeds and grass is received within the conical shaped portion 15 which causes the material to pass therethrough with a circuitous movement, or in other words causes the material to be turned over by the walls of the receiving portion, so that when the material is discharged from the enlarged end of the conical shaped portion, the material will be placed upon the ground in a reverse position from that which it initially occupied when introduced into the receiving portion, whereby the grass, weeds or the like are covered by the surplus dirt with a view of preventing their growth. In addition to this fact the conical shaped receiving portion 15 functionates in the capacity of a fender, in that it carries the coarser and surplus dirt away from the crop, thereby eliminating all possibility of this material being shoveled or thrown over upon the crop, which is very injurious especially to young crops, while the space between the blade 10 and the free edge of the receiving portion permits the finer and richer dirt to be discharged along the cutting edge 12 and deposited in the proper position with respect to the crops. As illustrated the free edge of the receiving portion is arranged rearwardly of the cutting edge 11 and inwardly of the cutting edge 12 so as not to interfere in any way with the function of the blade. It might here be stated that the blade as a unit may be constructed from any suitable material and of any desired dimensions without departing from the spirit of the invention, and while I have described what I consider the preferred embodiment of the invention, I desire to have it understood that such changes in the construction and arrangement of parts may be resorted to when desired as fall within the scope of what is claimed.

What is claimed is:—

1. A cultivator shovel comprising an elongated blade having longitudinal transverse cutting edges, and a substantially conical-shaped receiving portion having one edge secured to the blade and lying flush with the upper surface thereof, the conical-shaped portion being co-extensive in length with the length of the blade and terminating inwardly of the line of division between the blade and said member.

2. A cultivator shovel comprising a blade having a cutting edge, and a conical shaped receiving portion, a support, a standard depending from the support and pivotally connected with said receiving portion, a lever fulcrumed on said support, and a rod connecting the lever with said receiving portion whereby the shovel is placed in different inclinations with respect to the surface.

3. A cultivator shovel comprising a blade, and a conical shaped receiving portion thereon, said blade being detachable from said member, a support, a standard for suspending the shovel from the support, a pivotal connection between the standard and said shovel, a lever pivoted on said support, a rod connecting the lever with the shovel whereby the latter is placed in different inclinations with respect to the surface for the purpose specified.

In testimony whereof I affix my signature.

VALENTINE D. LAWRENCE.

Copies of this patent may be obtained for five cents each, by addressing the "Commissioner of Patents, Washington, D. C."